United States Patent
Prinzhorn et al.

(10) Patent No.: US 11,716,046 B2
(45) Date of Patent: Aug. 1, 2023

(54) CONTROL UNIT FOR CLOSED-LOOP PRESSURE CONTROL

(71) Applicant: HANON SYSTEMS EFP DEUTSCHLAND GMBH, Bad Homburg v.d. Höhe (DE)

(72) Inventors: Karl Prinzhorn, Friedberg (DE); Tu Hoang, Frankfurt am Main (DE)

(73) Assignee: HANON SYSTEMS EFP DEUTSCHLAND GMBH, Bad Homburg V.D. Höhe (DE)

( * ) Notice: Subject to any disclaimer, the term of this patent is extended or adjusted under 35 U.S.C. 154(b) by 0 days.

(21) Appl. No.: 17/436,783

(22) PCT Filed: Jul. 30, 2020

(86) PCT No.: PCT/DE2020/200062
§ 371 (c)(1),
(2) Date: Sep. 7, 2021

(87) PCT Pub. No.: WO2021/058067
PCT Pub. Date: Apr. 1, 2021

(65) Prior Publication Data
US 2022/0216819 A1 Jul. 7, 2022

(30) Foreign Application Priority Data
Sep. 25, 2019 (DE) .................... 10 2019 214 650.3

(51) Int. Cl.
*H02P 29/02* (2016.01)
*H02P 29/60* (2016.01)
(Continued)

(52) U.S. Cl.
CPC .............. *H02P 29/02* (2013.01); *H02P 23/14* (2013.01); *H02P 29/60* (2016.02); *F16D 48/02* (2013.01);
(Continued)

(58) Field of Classification Search
CPC .......... H02P 29/02; H02P 23/14; H02P 29/60; F16D 48/02; F16D 2500/104
(Continued)

(56) References Cited

U.S. PATENT DOCUMENTS 5,725,357 A * 3/1998 Nakazeki .............. F04D 29/048
417/18
6,414,453 B1 * 7/2002 Tamagawa ............... B60K 6/28
180/165
(Continued)

FOREIGN PATENT DOCUMENTS

DE 102011121286 A1 6/2012
DE 2573428 A1 3/2013
(Continued)

OTHER PUBLICATIONS

Chinese Office Action dated Apr. 4, 2023.

*Primary Examiner* — David Luo
(74) *Attorney, Agent, or Firm* — Shumaker, Loop & Kendrick, LLP; James D. Miller

(57) ABSTRACT

A control unit for controlling a motor of an oil pump. The control unit includes a receiving unit configured to receive a target pressure, a first determination unit configured to determine a torque from the target pressure and a speed of the motor via a first characteristic map, a second determination unit configured to determine a motor phase current from the determined torque via a second characteristic map, and an output unit configured to output the determined motor phase current.

12 Claims, 5 Drawing Sheets

(51) Int. Cl.
*H02P 23/14* (2006.01)
*F16D 48/02* (2006.01)
*F16H 57/04* (2010.01)

(52) U.S. Cl.
CPC .............. *F16D 2500/104* (2013.01); *F16D 2500/70217* (2013.01); *F16D 2500/70406* (2013.01); *F16H 57/0435* (2013.01)

(58) Field of Classification Search
USPC .............................................. 318/139, 3, 34
See application file for complete search history.

(56) References Cited

U.S. PATENT DOCUMENTS

| 6,975,080 B2* | 12/2005 | Kitamura | ................. | H02P 9/48 318/144 |
| 9,427,508 B2* | 8/2016 | Reyes | ................. | A61M 60/531 |
| 10,660,999 B2* | 5/2020 | Kallenbach | ......... | A61M 60/422 |
| 2010/0021313 A1 | 1/2010 | Devan et al. | | |
| 2012/0159939 A1 | 6/2012 | Xie | | |

FOREIGN PATENT DOCUMENTS

| DE | 102015119262 A1 | 3/2017 |
| DE | 102018101079 A1 | 7/2018 |
| EP | 2573428 A1 | 3/2013 |
| JP | H10210800 A | 8/1998 |
| JP | 2018156634 A | 10/2018 |
| KR | 20180117524 A | 10/2018 |

* cited by examiner

CONTROL UNIT FOR CLOSED-LOOP PRESSURE CONTROL

CROSS-REFERENCE TO RELATED PATENT APPLICATIONS

This patent application is a United States national phase patent application based on PCT/DE2020/200062 filed on Jul. 30, 2020, which claims the benefit of German Patent Application No. 10 2019 214 650.3 filed on Sep. 25, 2019, the entire contents of both of which are hereby incorporated herein by reference.

TECHNICAL FIELD

The present invention relates to a control unit for controlling a motor of an oil pump which is used, for example, for switching a clutch in a vehicle.

PRIOR ART

A pump unit consisting of an oil pump, a motor and a controller can be used for switching a clutch.

As soon as the pump unit has received a command to switch the clutch, the pump unit fills the clutch with transmission oil. Once the clutch has been filled and the kiss point has been exceeded, the required pressure is built up and the clutch is switched. The pressure remains constant until the desired release of the clutch. In this context, the kiss point is an actuation state in which the clutch discs are still just touching.

In the prior art, the pressure for switching the clutch is calculated iteratively via a motor current using controllers. This can be seen in the patent specification DE 10 2015 119 262 A1, for example, which discloses an arrangement for determining the pressure produced by a pump that is driven by means of an electric motor. DE 10 2015 119 262 A1 presents a control apparatus for controlling the pressure produced by the pump, comprising a controller which determines a control variable based on the difference between the target pressure and the actual pressure.

Determining pressure via the motor current using controllers is time-consuming since the pressure to be produced has to be calculated iteratively.

DESCRIPTION OF THE INVENTION

Against this background, an object of the present invention is to set a target pressure quickly, cheaply, easily and directly via the motor current, i.e. without iterative calculations using a controller.

This object is achieved by the control unit for controlling a motor of an oil pump as shown and described herein.

The control unit for controlling a motor of an oil pump comprises a receiving unit configured to receive a target pressure, a first determination unit configured to determine a torque from the target pressure and a speed of the motor via a first characteristic map, and a second determination unit configured to determine a motor phase current from the determined torque via a second characteristic map. The control unit also comprises an output unit configured to output the determined motor phase current.

As a consequence, a determined motor phase current is output on the basis of a desired target pressure, which operates the motor of an oil pump such that a pressure is produced that is equal to the desired target pressure. The direct conversion of a target pressure into the corresponding motor phase current means that a complicated and time-consuming control method that iteratively calculates the pressure via the motor current is unnecessary.

According to a preferred embodiment, the control unit additionally comprises a storage unit for storing a first characteristic map and a second characteristic map, wherein the first characteristic map represents a relationship between the target pressure, the speed of the motor and the torque and wherein the second characteristic map represents a relationship between the torque and the motor phase current.

Thus, to produce the desired pressure the motor phase current can be set in accordance with a target pressure without complicated calculations and without a sizable and expensive controller being provided.

According to a preferred embodiment, the receiving unit is also configured to receive an oil temperature, wherein the first characteristic map and the second characteristic map are selected based on the oil temperature.

The motor phase current can therefore be determined more accurately since the oil temperature is taken into account when determining the torque and the motor phase current based on the torque.

According to a preferred embodiment, the control unit additionally comprises a first safety unit configured to limit the motor phase current.

As a consequence, the motor and the hardware of a pump unit, consisting of the control unit, the oil pump and the motor, can be protected by phase current limiting.

According to a preferred embodiment, the control unit additionally comprises a second safety unit configured to limit the speed of the motor.

As a consequence, noise suppression occurs due to speed limiting.

According to a preferred embodiment, the second safety unit is configured to increase a filling time of the oil pump in order to limit the speed of the motor, wherein the filling time indicates a duration for filling a unit connected to the oil pump by the oil pump.

As a consequence, noise suppression occurs due to speed limiting.

According to a preferred embodiment, the control unit additionally comprises a third safety unit configured to limit a battery current applied to the motor.

As a consequence, the motor and the hardware of a pump unit, consisting of the control unit, the oil pump and the motor, can be protected by battery current limiting.

According to a preferred embodiment, the control unit is configured to control a transmission oil pump.

According to a preferred embodiment, the control unit is configured to control an oil pump which fills a clutch connected to the oil pump with oil for switching the clutch.

As a consequence, a clutch can be switched quickly and properly.

The present invention also relates to a control method for controlling a motor of an oil pump, which comprises the steps of receiving a target pressure, determining a torque from the target pressure and a speed of the motor via a first characteristic map, determining a motor phase current from the determined torque via a second characteristic map, and outputting the determined motor phase current.

DESCRIPTION OF PREFERRED EMBODIMENTS

In the following, preferred embodiments of the present invention will be described in detail with reference to the accompanying drawings. In the various drawings, identical or corresponding elements are provided with identical or similar reference signs.

The preferred embodiments of the invention, which will be described in detail in the following, will be described in detail with reference to control units for controlling a motor of an oil pump which is used, for example, for switching a clutch in a vehicle. More specifically, the control units can be configured to control an oil pump which fills a clutch connected to the oil pump with oil for switching the clutch. However, it should be noted that the description below only contains examples and should not be considered to be limiting the invention.

Figure 1:
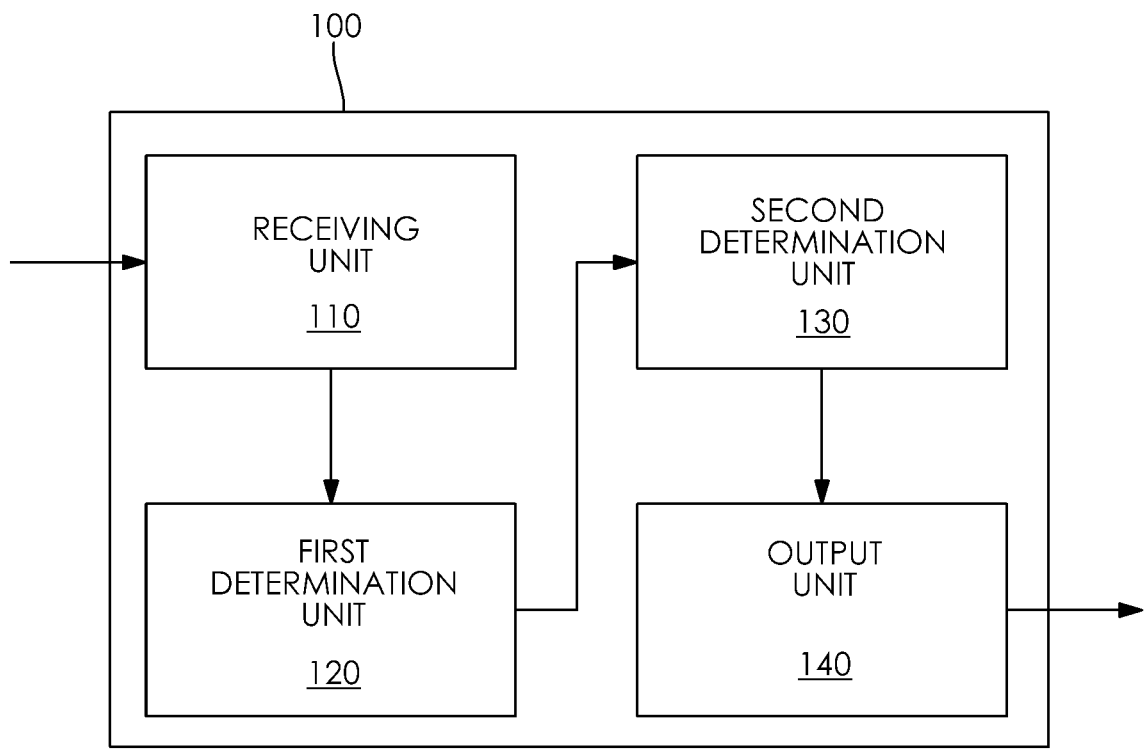
FIG. 1 shows a control unit for controlling a motor of an oil pump as according to one embodiment of the present invention.

FIG. 1 shows a control unit 100 for controlling a motor of an oil pump as according to one embodiment of the present invention. In the following, the control unit 100 will be described in detail with reference to FIG. 1. The control unit 100 can be configured to control an oil pump, in particular a transmission oil pump.

The control unit 100 comprises a receiving unit 110, a first determination unit 120, a second determination unit 130 and an output unit 140. The control unit 100 does not contain pressure sensors, however.

The receiving unit 110 of the control unit 100 receives a target pressure required for switching a clutch of a vehicle, for example. Receiving a target pressure can be interpreted as a command for switching the clutch. The target pressure can, for example, be sent from a transmission control unit to the control unit 100 via LIN or CAN communication or the like.

The first determination unit 120 receives the target pressure from the receiving unit 110 and determines a torque from the target pressure and a speed of the motor via a first characteristic map. The speed of the motor is transmitted to the control unit 100 continuously or at specific points in time, for example, in order to determine the torque.

The second determination unit 130 then determines a motor phase current from the determined torque via a second characteristic map. It is therefore possible to translate the transmitted target pressure into a motor phase current via stored characteristic maps.

For example, the control unit 100 comprises a storage unit (not shown) which stores the first characteristic map and the second characteristic map. The first characteristic map can represent a relationship between the target pressure, the speed of the motor and the torque, and the second characteristic map can then represent a relationship between the torque and the motor phase current. The relationship between the target pressure, the speed of the motor and the torque and the relationship between the torque and the motor phase current may, for example, be linear or may be interpolated using a polynomial. It is therefore possible to determine a motor phase current accurately, straightforwardly and quickly on the basis of a target pressure, wherein the motor phase current is required in order to set, with the help of an oil pump, a desired pressure, which is equal to the target pressure, for example on a clutch. A transmission oil pump, for example, can be used as the oil pump.

Separation into a first characteristic map and a second characteristic map is advantageous if, for example, one pump is provided with various motors (or vice versa). One characteristic map remains the same in each case. However, if this is not necessary, for example when there is definitely only one variant, it is possible to combine the two characteristic maps into one characteristic map.

Furthermore, the control unit 100 comprises an output unit which outputs the determined motor phase current. For example, the motor phase current is output to a motor for operating an oil pump.

Figure 2:
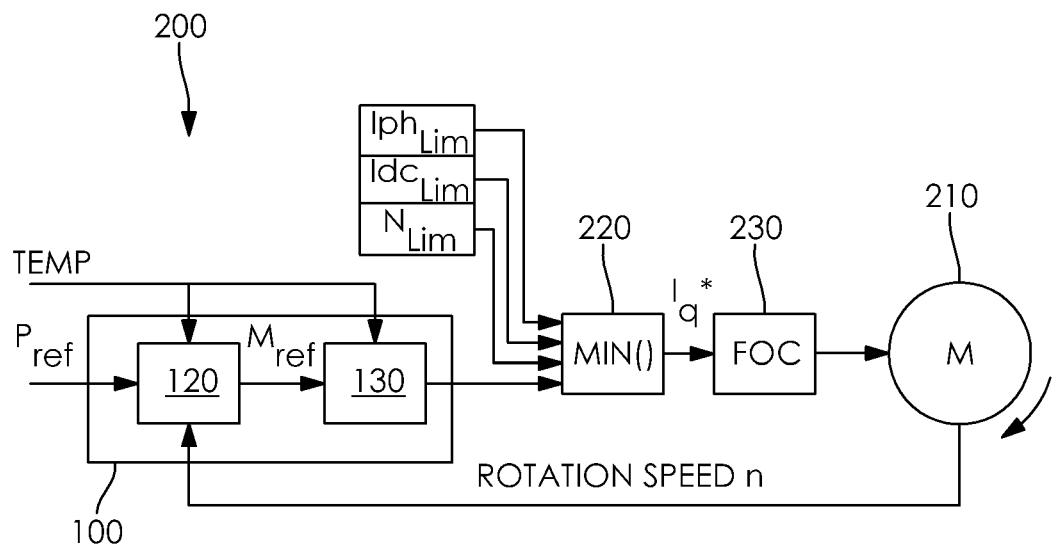
FIG. 2 shows an example of a pump unit consisting of the control unit and the motor of the oil pump.

FIG. 2 shows an example of a pump unit 200 comprising a control unit, a motor and an oil pump (not shown). In the following, the pump unit 200 will be described in detail with reference to FIG. 2.

The pump unit 200 comprises the control unit 100, which has been described in detail with reference to FIG. 1, and the motor 210, which drives an oil pump (not shown). For the sake of clarity and simplicity, a detailed description of the control unit 100 will not be provided here and reference is made to the description above.

As has already been described in detail, the control unit 100 can receive a target $P_{ref}$ which can be seen, for example, as a command for switching a clutch in a vehicle with the help of the oil pump of the pump unit 200 and the target pressure. The target pressure $P_{ref}$ can be received by the receiving unit 110 and transmitted to the first determination unit 120. For the sake of clarity, the receiving unit is not shown in FIG. 2 and the target pressure $P_{ref}$ is transmitted directly to the first determination unit 120. Moreover, the speed n of the motor 210 is transmitted to the first determination unit 120. The speed n of the motor 210 can be sent to the first determination unit 120 continuously or at specific points in time.

As soon as the first determination unit 120 has received the target pressure $P_{ref}$ and the speed n, the first determination unit 120 can determine a torque $M_{ref}$ from the target pressure $P_{ref}$ and the speed n via a first characteristic map. In the control unit 100, various characteristic maps are stored, for example, which each represent a relationship between the target pressure, speed and torque for a particular oil temperature. The relationship between the target pressure, speed and torque may, for example, be linear or may be interpolated using a polynomial. The control unit 100, in particular the receiving unit 110 of the control unit 100, can additionally receive an oil temperature as a further input parameter, wherein the first characteristic map can be selected on the basis of the oil temperature. The oil temperature is transmitted to the control unit 100 for example by a user, or the oil temperature is measured in the oil pump and then transmitted to the control unit 100.

As soon as the torque $M_{ref}$ has been determined based on the target pressure $P_{ref}$ and the speed n according to the first characteristic map for the oil temperature, the torque $M_{ref}$ is transferred to the second determination unit 130, wherein the second determination unit 130 determines the motor phase current as a function of the torque $M_{ref}$ using a second characteristic map. In the control unit 100, various characteristic maps are stored, for example, which each represent a relationship between the torque and motor phase current for a particular oil temperature. The relationship between the torque and motor phase current may, for example, be linear or may be interpolated using a polynomial. The oil temperature input by a user or measured in the oil pump can therefore be used again for selecting the second characteristic map. By taking into account the oil temperature, the motor phase current can be determined more accurately.

When the motor phase current has been determined, the motor phase current can be output to the motor 210 that drives an oil pump in accordance with the motor phase current. In the example shown in FIG. 2, the motor 210 is controlled by a field-oriented control (FOC) 230. The oil pump fills a clutch, for example, in which pressure is built up for switching said clutch. Since the motor phase current is set on the basis of the target pressure, a desired pressure, which is equal to the target pressure, is built up in the clutch quickly and easily, without iterative calculations by a controller.

In order to additionally improve safety in the pump unit and to suppress noise from the motor, the control unit may comprise one or more safety units. The safety units may, for example, limit the motor phase current, the speed of the motor and/or the battery current applied to the motor 210. Various safety units may be present, with each unit limiting one of motor phase current, speed or battery current, or one safety unit may be present which limits motor phase current, speed and battery current.

An exemplary safety unit 220 which limits at least one of motor phase current, speed and battery current is shown in FIG. 2. The safety unit 220 can receive the motor phase current determined with the help of the second characteristic map and can additionally receive a maximum permitted value of the motor phase current $Iph_{Lim}$, a maximum permitted value of the connection/battery current $Idc_{Lim}$, which, for example, is a direct current and is applied to the motor 210, and/or a maximum permitted value of the speed of the motor $n_{Lim}$. An exemplary value for $Iph_{Lim}$ is 40 A, for $Idc_{Lim}$ 20 A and for $n_{Lim}$ 5000 1/min.

The maximum values are determined for example when the pump unit is manufactured and are output to the pump unit or they can be dynamically determined individually by the user depending on the desires of the user when commissioning the pump unit and output to the control unit, in particular the safety unit. To limit the motor phase current the present phase current and the maximum permitted value $Iph_{Lim}$, for example, are received by the pump unit as input parameters and based on these values a new motor phase current $Iph_{Lim}\_Iq^*$ is output, which ensures the maximum value $Iph_{Lim}$. To limit the battery current, the present calculated battery current and the maximum permitted value $Idc_{Lim}$, for example, are received by the pump unit as input parameters and based on these values a new motor phase current $Idc_{Lim}\_Iq^*$ is output, which ensures the maximum value $Idc_{Lim}$. To limit the speed of the motor, the present speed and the maximum permitted value $n_{Lim}$, for example, are received by the pump unit as input parameters and based on these values a new motor phase current $n_{Lim}\_Iq^*$ is output, which ensures the maximum value $n_{Lim}$.

Subsequently, the safety unit 220 outputs the minimum of the values $Iph_{Lim}\_Iq^*$, $Idc_{Lim}\_Iq^*$ and $n_{Lim}\_Iq^*$ transferred thereto. In this respect MIN( ) in FIG. 2 means that the minimum value of all transferred values is determined and the minimum of the transferred values is output as the new motor phase current $Iq^*$ to, for example, the FOC. For this, the transferred values are weighted, for example, and in the event of a value in the critical range, this will be limited. In the case of a plurality of values, the smallest critical value will be detected and output to the FOC. As a result, the remaining transferred values remain under their limit. In the event of limiting the values, power limiting may occur, for example, such that a warning is issued where necessary.

For instance, it is sometimes necessary that a predetermined maximum current value at the connector plug, i.e. a maximum battery current value, is not exceeded. The current at the connector plug can be limited to a maximum value $Idc_{Lim}$, particularly to avoid the current peaks present when starting up the motor pump unit which are caused by a moment of inertia, for example. In this way, the safety and service life of a pump unit can be improved. The maximum current value at the connector plug can be predetermined by a user or by a manufacturer of the pump unit.

Furthermore, phase current limiting can be performed to protect the motor and hardware from overcurrents. For this, a maximum phase current value $Iph_{Lim}$ can be transmitted to the safety unit 220, wherein the maximum phase current value $Iph_{Lim}$ is predetermined for example by the user or by the manufacturer of the pump unit.

In order to reduce noise in the pump unit, the speed of the motor 210 in the filling phase of the clutch can be reduced by means of the oil pump as far as is possible in accordance with the permitted period of time before the clutch is switched. For this, the speed n of the motor when filling the clutch is adjusted in accordance with the maximum speed value $n_{Lim}$ that is transmitted to the safety unit 220. When a start signal is received, the motor initially starts up in a load-free manner, for example, to a maximum possible speed in accordance with its characteristic curve. Then, the speed can be limited by the safety unit 220 if the required maximum permitted period of time before the clutch is switched (also referred to as the filling phase of the clutch) is not utilized. Accordingly, the filling time can be increased to the maximum permitted time (for example 200 ms). This allows the motor speed n to be reduced at the same time. As a result of the lower speed of the motor 210, less noise is produced.

After the phase current limiting, the connection current limiting and/or the speed limiting, the safety unit 220 can then output the new motor phase current $Iq^*$ to the motor 210, as described above, wherein the new motor phase current may deviate from the motor phase current determined by the second characteristic map. As a result, the safety and service life of the pump unit can be improved and noise can be reduced.

Figure 3:
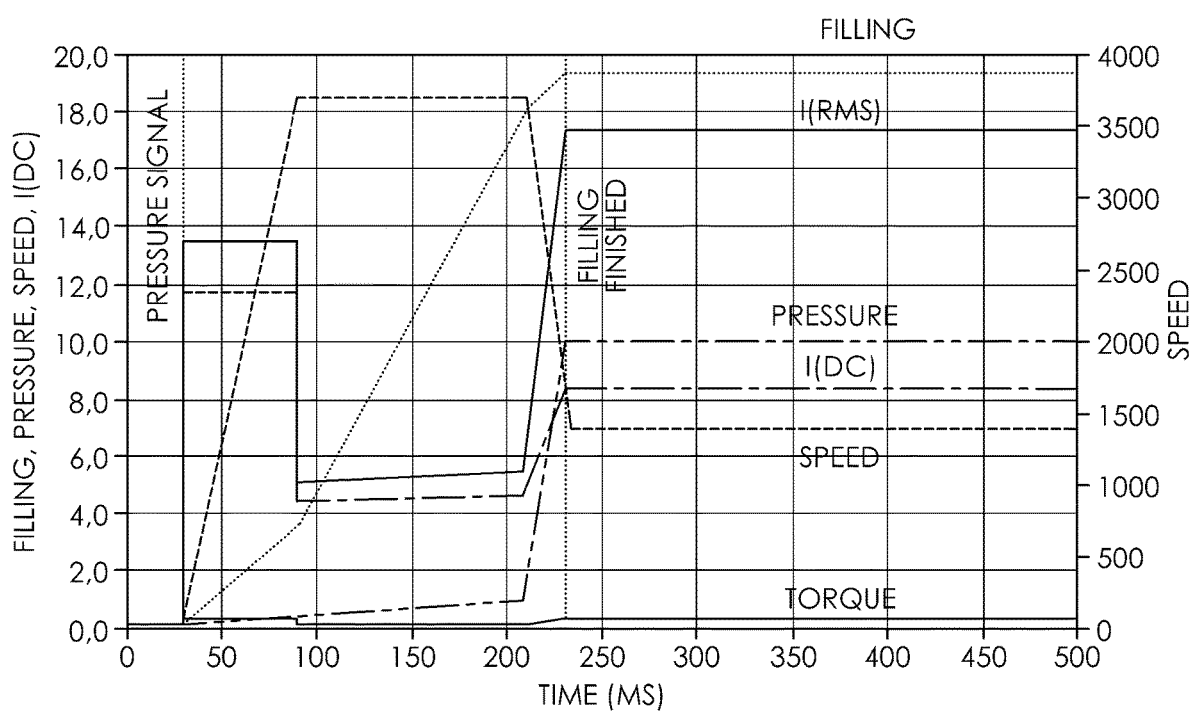
FIG. 3 is a diagram of a switching operation of one embodiment of the present invention.
Figure 4A:
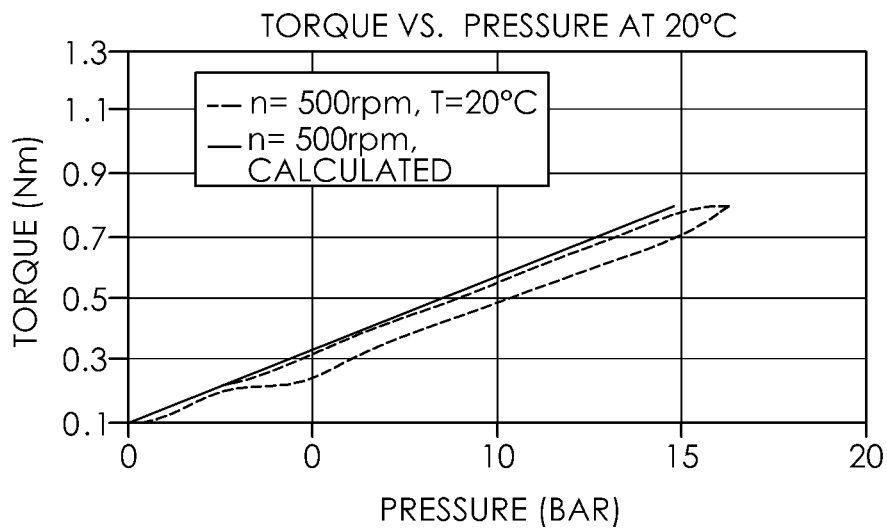
FIGS. 4A-4D show exemplary characteristic maps for a torque as a function of pressure, speed and temperature.
Figure 4B:
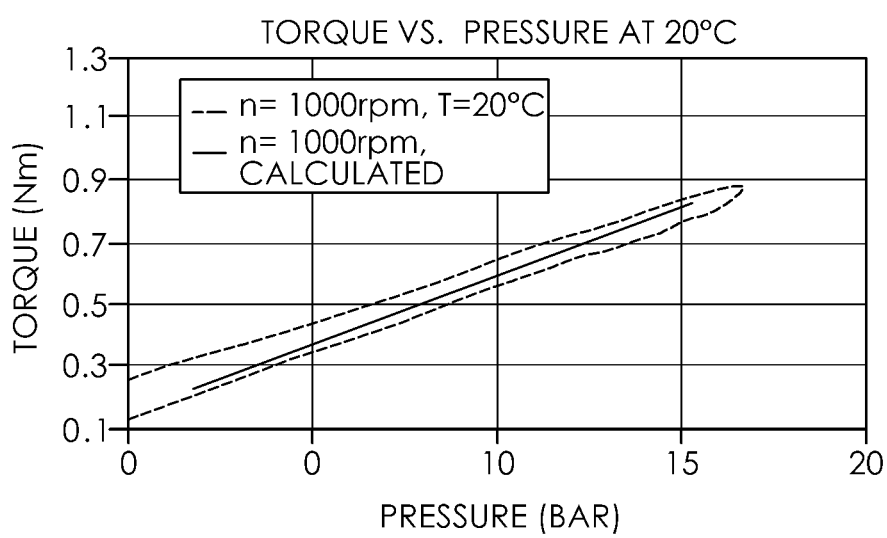
Figure 4C:
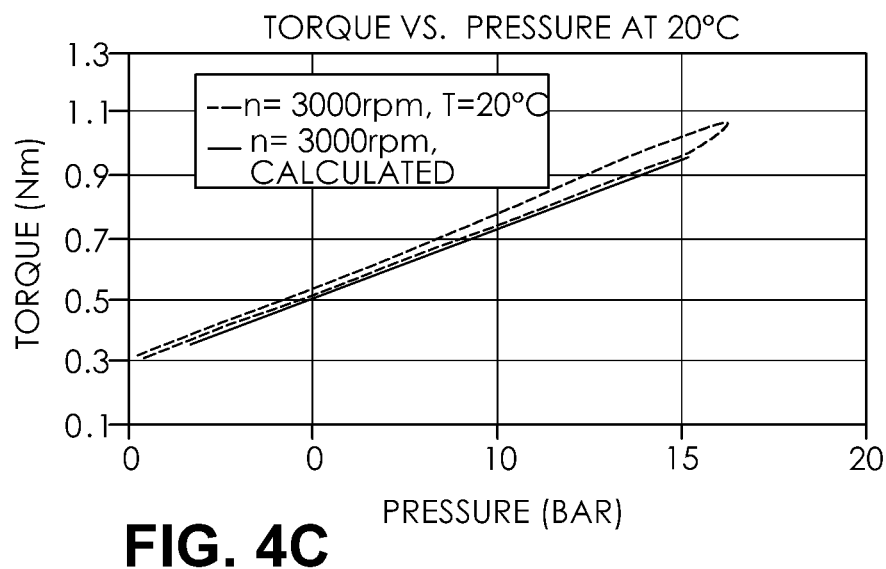
Figure 4D:
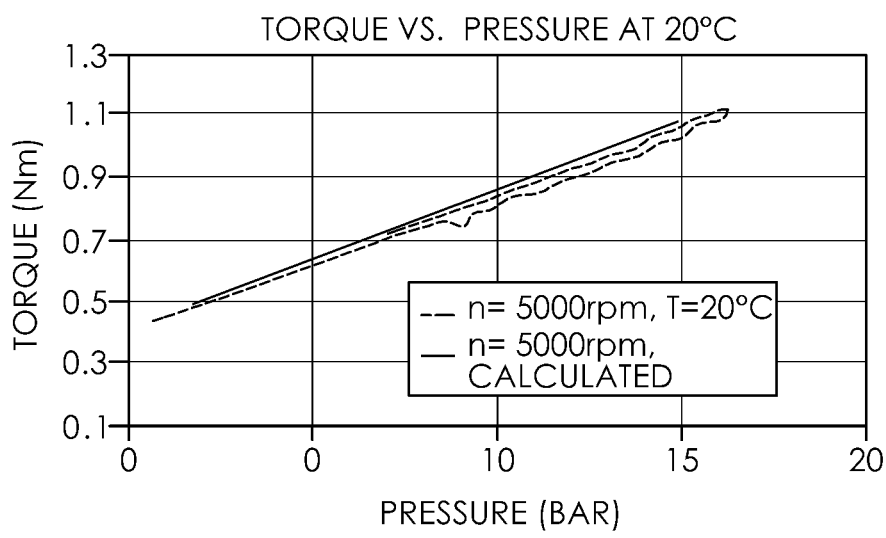

FIG. 3 shows a diagram of a filling process of one embodiment of the present invention. The filling process is described for the example of switching a clutch in a vehicle by means of a target pressure. The x axis of the diagram shown in FIG. 3 represents the time in milliseconds (ms) and the y axis represents either the filling amount, the oil pressure and the connection current/battery current I(DC) or the speed of the motor.

When a pressure signal is received for example by the control unit of the pump unit, the filling of the clutch by an oil pump begins. The pressure signal is interpreted as a command to switch the clutch and may be the receipt of a target value at the control unit 100. Once the pressure signal is received, the filling of the clutch is started, wherein the fill level in the clutch increases (see also "Filling" in the graph of FIG. 3). As soon as the filling has finished, the fill level in the clutch remains constant (in FIG. 3 after approximately 230 ms).

After the pressure signal has been received, both the phase current I(rms) and the connection/battery current I(DC) jump to their maximum values. The maximum value of the phase current or of the connection current may be the maximum possible value or a value set by the user or manufacturer via the safety unit, as described above, to improve the safety and service life of the pump unit. The phase current I(rms) remains constant at a target value once the filling has finished.

Moreover, the speed of the motor of the pump unit increases once the pressure signal has been received, wherein the speed is limited here to approximately 3,700 rotations per minute, for example. Limiting the speed during the filling phase means that the filling of the clutch can be finished within a permitted period of time. In the example in FIG. 5, a permitted period of time for filling the clutch is approximately 230 ms. If we wanted to limit the speed of the motor in order to reduce noise, for example, the filling time of the oil pump can be increased to the maximum permitted time period (e.g. 230 ms), wherein the filling time indicates a duration for filling a unit connected to the oil pump by the oil pump, in this case for filling the clutch connected to the oil pump. Once the filling of the clutch has finished, the speed of the motor remains constant (in this case at approx. 1,400 rotations per minute, for example).

Furthermore, when filling the clutch the required pressure is built up once the kiss point of the clutch has been exceeded, which results in the switching of the clutch. As can be seen from FIG. 3, the kiss point, i.e. the actuation state in which the clutch discs are still just touching, is exceeded after approximately 210 ms and the pressure builds up. The pressure remains constant once the filling has finished until the desired release of the clutch.

Moreover, the torque increases, which remains constant even after the filling has finished.

If the clutch is released, all of the values shown in FIG. 3 as graphs go back to their starting value (not shown).

FIGS. 4A-4D exemplary characteristic maps for a torque as a function of pressure, speed and temperature, wherein in this example the characteristic maps represent linear relationships between pressure and torque as a function of speed and temperature. These characteristic maps can be stored in the control unit of the pump unit and can be used as a first characteristic map as a function of the oil temperature in order to determine the torque $M_{ref}$. The characteristic maps are, for example, obtained by the speed of the motor, the pressure and the torque being measured at a constant oil temperature, and these being entered into a coordinate system as a function of one another. A two-dimensional coordinate system can be used, for example, which indicates the dependency of pressure and torque at a constant speed (or, accordingly, the dependency of speed and torque at a constant pressure), or a three-dimensional coordinate system can be used, which indicates the dependency of pressure, speed and torque.

As soon as the measured values have been entered into the corresponding coordinate system, a straight line can be found, which, with just the slightest deviation from the measured values, indicates the linear dependencies of pressure and torque and of speed and torque. The resulting characteristic maps can be used to easily and quickly determine the torque based on the pressure and the speed at a particular oil temperature.

The same process is repeated for the second characteristic map in order to obtain a relationship between the torque and motor phase current.

Figure 5:
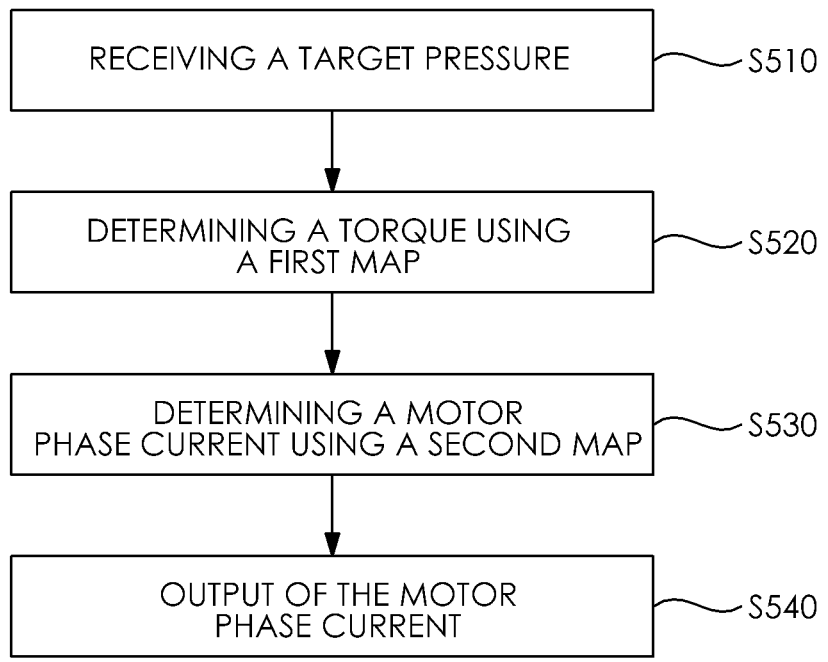
FIG. 5 is a flow diagram for a control method as according to one embodiment of the present invention.

FIG. 5 is a flow diagram for a control method as according to one embodiment of the present invention. The control method controls, for example, a motor of an oil pump and is carried out by the control unit described above. The control method will now be described in detail with reference to FIG. 5.

In step S510, a target pressure is received, for example by the receiving unit 110 of the control unit 100.

Then, in step S520, a torque is determined from the target pressure and a speed of the motor via a first characteristic map, for example by the first determination unit 120 of the control unit 100.

Next, in step S530, a motor phase current is determined from the determined torque via a second characteristic map, for example by the second determination unit 130 of the control unit 100.

Next, in step S540, the determined motor phase current is output, for example by the output unit 140 of the control unit 100.

The control unit described above may comprise a bus, a processing unit, a memory, ROM and a communication interface. The bus can facilitate communication between the units of the control unit. The processing unit may comprise a processor, a microprocessor or a processing logic, which can interpret and carry out commands. The memory may comprise a RAM or a different type of dynamic storage device which can store information and software commands for implementation by the processing unit. Moreover, the memory can store characteristic maps for determining the torque and the motor phase current.

The control unit can carry out the operations and processing described above. The control unit carries out these operations by means of the processing unit, which carries out software commands contained in a computer-readable medium. A computer-readable medium can be defined as a physical or logical storage device. A logical storage device may be a storage region within an individual physical memory or distributed over a plurality of physical storage devices.

The commands contained in the memory may cause the processing unit, when executed on a processor, to make the processor carry out the aforementioned operations or processing. Alternatively, a hard-wired circuit can be used instead of or in combination with software commands to carry out the processes and/or processing described above. Thus, the aforementioned implementation is not limited to a specific combination of hardware and software.

If the term control unit is used, there is no restriction as to how these units are distributed or grouped together. This means that the unit can be distributed in different software and hardware components or other elements in order to implement the described function. A plurality of different elements may also be grouped together in order to implement the described functionalities.

The elements of the control unit can be implemented in hardware, software, field programmable gate arrays (FPGA), application-specific integrated circuits (ASIC), firmware or the like.

The invention claimed is:

1. A control unit to control a motor of an oil pump, the control unit comprising:
   a receiving unit configured to receive a target pressure;
   a first determination unit configured to determine a torque from the target pressure and a speed of the motor via a first characteristic map;
   a second determination unit configured to determine a motor phase current from the torque via a second characteristic map; and
   an output unit configured to output the motor phase current, wherein the first characteristic map represents a relationship between the target pressure, the speed of the motor, and the torque, and wherein the second characteristic map represents a relationship between the torque and the motor phase current.

2. The control unit according to claim 1, further comprising:
a storage unit to store the first characteristic map and the second characteristic map.

3. The control unit according to claim 1, wherein the receiving unit is further configured to receive an oil temperature, and wherein the first characteristic map and the second characteristic map are selected based on the oil temperature.

4. The control unit according to claim 1, further comprising:
a first safety unit configured to limit the motor phase current.

5. The control unit according to claim 4, further comprising:
a second safety unit configured to limit the speed of the motor.

6. The control unit according to claim 5, wherein the second safety unit is configured to increase a filling time of the oil pump in order to limit the speed of the motor, wherein the filling time indicates a duration to fill a unit connected to the oil pump by the oil pump.

7. The control unit according to claim 5, further comprising:
a third safety unit configured to limit a battery current applied to the motor.

8. The control unit according to claim 1, wherein the control unit is configured to control a transmission oil pump.

9. The control unit according to claim 1, wherein the control unit is configured to control the oil pump which fills a clutch connected to the oil pump with oil for switching the clutch.

10. A control method to control a motor of an oil pump, the method comprising steps of:
receiving a target pressure;
determining a torque from the target pressure and a speed of the motor via a first characteristic map;
determining a motor phase current from the torque via a second characteristic map; and outputting the motor phase current, wherein the first characteristic map represents a relationship between the target pressure, the speed of the motor, and the torque, and wherein the second characteristic map represents a relationship between the torque and the motor phase current.

11. A control unit to control a motor of an oil pump, the control unit comprising:
a receiving unit configured to receive a target pressure;
a first determination unit configured to determine a torque from the target pressure and a speed of the motor via a first characteristic map;
a second determination unit configured to determine a motor phase current from the torque via a second characteristic map; and
an output unit configured to output the motor phase current, wherein the receiving unit is further configured to receive an oil temperature, and wherein the first characteristic map and the second characteristic map are selected based on the oil temperature.

12. A control unit to control a motor of an oil pump, the control unit comprising: a receiving unit configured to receive a target pressure; a first determination unit configured to determine a torque from the target pressure and a speed of the motor via a first characteristic map; a second determination unit configured to determine a motor phase current from the torque via a second characteristic map; an output unit configured to output the motor phase current; a first safety unit configured to limit the motor phase current; and a second safety unit configured to limit the speed of the motor, wherein the second safety unit is configured to increase a filling time of the oil pump in order to limit the speed of the motor, wherein the filling time indicates a duration to fill a unit connected to the oil pump by the oil pump.

* * * * *